United States Patent [19]

Klink

[11] 4,241,152
[45] Dec. 23, 1980

[54] DISCONNECTABLE GAS-TIGHT AND PRESSURE-RESISTANT ELECTRICAL LEAD-OUT

[75] Inventor: Rainer Klink, Kernen, Fed. Rep. of Germany

[73] Assignee: Deutsch Automobilgesellschaft mbH, Fed. Rep. of Germany

[21] Appl. No.: 94,328

[22] Filed: Nov. 14, 1979

[30] Foreign Application Priority Data

Nov. 14, 1978 [DE] Fed. Rep. of Germany ....... 2849326

[51] Int. Cl.³ .............................................. H01M 2/02
[52] U.S. Cl. ................................... 429/181; 429/183; 429/185
[58] Field of Search ........ 429/178, 180, 181, 183–185; 339/60 R, 61 R, 252 R

[56] References Cited

U.S. PATENT DOCUMENTS

| | | | |
|---|---|---|---|
| 3,488,227 | 1/1970 | Siwek | 429/183 |
| 3,510,353 | 5/1970 | McHenry | 429/181 X |
| 3,968,022 | 7/1976 | Eng et al. | 429/180 X |
| 3,996,065 | 12/1976 | Trippe et al. | 429/183 X |
| 4,164,609 | 8/1979 | Jensen | 429/183 |

OTHER PUBLICATIONS

J. Electrochem. Soc. 1972, pp. 564–568.
The Electrochem. Soc., Extended Abstracts 78-2, pp. 51, 52.

*Primary Examiner*—Charles F. Lefevour
*Attorney, Agent, or Firm*—Craig and Antonelli

[57] ABSTRACT

A disassemblable gas-tight and pressure-resistant electrical lead-out for battery cells, consisting of a metallic fixed outer sleeve, a metallic bolt effecting the current conduction and of an insulating piece disposed between the sleeve and the bolt that consists of three sleeve-shaped insulating members disposed axially one behind the other and filling out the interstice between bolt and sleeve; the center insulating member consists of a practically gas-tight deformable material while the two outer members consist of a non-deformable material and at least one of the two outer members is adapted to be axially tightened with respect to the center member; the two outer members are provided on their side facing the center member with a ring-shaped raised portion which penetrates into the center member during axial tightening.

19 Claims, 3 Drawing Figures

DISCONNECTABLE GAS-TIGHT AND PRESSURE-RESISTANT ELECTRICAL LEAD-OUT

The present invention relates to a disassemblable, gas-tight and pressure-resistant current lead-out or lead-in connection.

Gas-tight, pressure-resistant current lead-outs are always necessary where an electrical conductor has to be extended through a metallic wall and the wall is exposed to a large pressure difference.

Such systems are, for example, a container of a vacuum installation, in the interior of which is located an electric load. In particular, such electrical lead-out connections are required for the cells of the service-free re-chargeable nickel-cadmium batteries and in hydrogen cells, for example, in nickel-hydrogen cells, in which the active cell parts are surrounded by a tight metal housing and in which hydrogen gas exists under a pressure up to about 50 bars. Since the length of life of such cells should amount to several years, the electrical lead-outs must have an extremely low leakage rate.

In general, an electrical lead-out consists of an outer metallic sleeve which is connected hermetically with the container, of an inner metallic conductor which effects the current-carrying function and of an insulating material disposed between the sleeve and the conductor.

It is known to use glass or ceramics as insulating material between sleeve and conductor. Such electrical lead-outs, however, are not particularly sturdy and stable and exhibit high failure rates over longer periods of time (*J. Electrochemical Society*, 1972, pages 564–568).

An improvement of the glass-metal or ceramic-metal-electrical lead-out connection is described in the U.S. Pat. No. 3,109,055. In this patent, a narrow cylindrical current conductor is surrounded sleeve-shaped by a tough thermoplastic material. A special thread is applied externally on this synthetic plastic material sleeve. In its turn, the synthetic plastic material sleeve is inset into a metallic sleeve which carries the corresponding internal thread. A sealing effect comes into existence only in that the metal sleeve is radially compressed within its center area by a tool, whereby the threads are completely filled out by the material of the threaded synthetic plastic material sleeve and therebeyond the current conductor is tightly surrounded with high pressure.

Though favorable characteristics as regards mechanical rigidity, respectively, elasticity, tightness with respect to high pressures and electrical insulation of the current conductor itself result from the construction described above, nevertheless one should mention as disadvantages that the individual elements of the electrical lead-out can no longer be disassembled without destruction, that the ratio of the diameter of the current conductor to the external diameter of the metal sleeve is very unfavorable (about 1:6) and thus the electrical lead-out is not suitable as heavy current or power conduction as is necessary, for example, in traction batteries, and in that a length which is excessively great in relation to the diameter is necessary (about 1:20) so that altogether a large structural space will be required. Furthermore, it is necessary after compressing the outer metal sleeve, in its turn, to connect the latter with a flange or to mount the same on a container wall which entails a further difficulty—also in relation to tightness.

Another type of such an electrical lead-out connection for smaller gas-tight nickel-cadmium cells is described in the U.S. Pat. No. 3,510,353. In this patent, a long, thin current conductor is covered with a small plastic tube, over which is placed a metal pipe. The sealing effect is achieved by a radial squeezing-in action at several places distributed over the length, whereby an electrical contact between the current conductor and the metal pipe must be avoided. This electrical lead-out is suited in practice only for the arrangement illustrated in the patent. The ratio of diameter of the current conductor to the outer diameter of the metal pipe is better compared to the arrangement described hereinabove, but still amounts to about 1:4.7. Therebeyond, also in this case, the same disadvantages arise as regards general application, which are exhibited by the electrical lead-out according to U.S. Pat. No. 3,109,055.

Furthermore, an electrical lead-out described recently in The Electrochemical Society, Extended Abstracts 78-2, pages 51, 52, in which the sealing takes place in the manner of a packing box or gland by deformation of a soft plastic material. For that purpose, a pear-shaped or bottle-shaped convexity or bulge (sleeve) is formed into a thin steel housing for Ni/H$_2$ cells. The metallic bolt is inserted concentrically into this bulge or convexity and is insulated with respect to the sleeve by a ring-shaped Teflon center piece. Ceramic disks are placed over the bolt as pressure members on both sides of the Teflon center piece. The ceramic disk on the inside of the cell abuts at a collar of the bolt whereas the outer ceramic disk is supported at the nut screwed on externally by way of a cup spring packet. By tightening the nut, the Teflon center piece is so compressed by the ceramic disks that it fills out the pear-shaped external sleeve. The force flow from the inside toward the outside thereby takes place from the inner ceramic disk by way of the Teflon center piece to the sleeve. The tightening force to be applied is determined by the configuration of the external sleeve, especially by the diameter of the bottle-shaped constriction, which absorbs a large portion of the axial force as abutment. However, it is disadvantageous with this lead-out construction that during the tightening of the Teflon center piece, very high forces occur for achieving a safe sealing so that at times the metallic bolt is even stretched or elongated.

Consequently, it is the aim of the present invention to provide a disassemblable electrical lead-out connection in the manner of a gland or packing box, in which a safe gas-tight seal is achieved also with abandonment of cup springs or especially of a pear- or bottle-shaped configuration of the sleeve and especially with abandonment of excessive tightening or clamping forces.

The underlying problems are solved according to the present invention by a disassemblable gas-tight and pressure-resistant electrical lead-out connection for battery cells, consisting of a fixed metallic outer sleeve, of a metallic bolt effecting the current conduction and of an insulating piece disposed between the sleeve and of the bolt and consisting of three sleeve-shaped insulating members axially disposed one behind the other and filling out the interspace between the bolt and sleeve, whereby the center member consists in the manner of a gland packing or gasket of a practically gas-tight deformable material while the two outer insulating members consist of a form-stable or non-deformable material and at least one of the two outer insulating members is adapted to be tightened axially against the center member, which is characterized in that the two outer members are provided on their side facing the center member with a ring-shaped embossment or raised portion which penetrates into the center member during axial tightening.

The ring-shaped embossment or raised portion preferably arranged approximately centrally deforms the center part during axial tightening of the arrangement by its penetration so that the space between current-conducting bolt and sleeve is filled out by radial expansion of the center part. The cross-section of the ring-shaped raised portion approximates generally the form of a generally isosceles triangle whose flanks penetrating into the center part form an angle of about 60° to about 120°. Depending on the characteristics of the deformable center part, it may thereby be advantageous to construct the flanks of the embossment or raised portion straight or curved or to construct the narrowest zone of the raised portion which faces the center part, as cutting edge or annular bead. However, the construction as cutting edge with straight flanks which subtend an angle of about 90° is preferred.

Accordingly, it is an object of the present invention to provide a disassemblable, gas-tight and pressure-resistant electrical lead-out which avoids by simple means the aforementioned shortcomings and drawbacks encountered in the prior art.

Another object of the present invention resides in an electrical lead-out connection which is characterized by long life of service, relatively high current-carrying capacity and small space requirements.

A further object of the present invention resides in an electrical lead-out of the type described above which can be assembled in a simple manner and can again be disassembled without requiring destruction of any parts.

Still a further object of the present invention resides in an electrical lead-out connection which obviates the need for excessively large tightening forces, yet assures a safe and reliable seal even at relatively elevated pressures within the container or cell.

Another object of the present invention resides in an electrical lead-out, particularly for batteries, which is simple, requires relatively few parts, and assures reliable operation over long periods of time.

These and other objects, features and advantages of the present invention will become more apparent from the following description when taken in connection with the accompanying drawing which shows, for purposes of illustration only, several embodiments in accordance with the present invention, and wherein.

Figure 1:
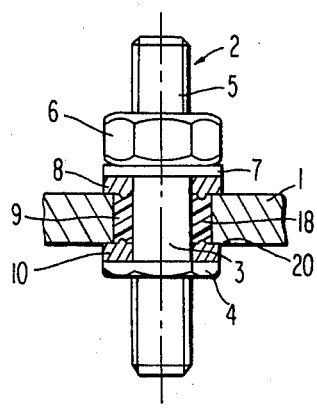
FIG. 1 is an axial cross-sectional view through one embodiment of an electrical lead-out in accordance with the present invention.

Referring now to the drawing wherein like reference numerals are used throughout the various views to designate like parts, FIG. 1 illustrates a section of a container wall 1, into which is inset the electrical lead-out connection. The container wall is sufficiently thick in this case to serve as external sleeve. The metallic bolt generally designated by reference numeral 2 which effects the current conduction, and which is made from a good current-conducting material, for example, of nickel, is constructed in its center area 3 as cylinder with a smooth surface. A collar 4 is disposed below the center area 3, which serves for the absorption of forces during the tightening of the insulating body. The collar 4 can also be constructed as nut, which is adapted to be screwed together with the bolt by means of a thread. Above the center area 3, the bolt 2 has a thread 5 which serves for the mounting of the nut 6, with the aid of which the insulating body is to be tightened. The washer 7 thereby serves for the protection of the insulating member. It can also be constructed as lock washer against unintentional rotation of the nut 6. The center area of the bolt is surrounded by three insulating bodies or members 8, 9 and 10. The center insulating body or member 9 consists of a practically gas-tight deformable material, i.e., having an extremely low permeability with respect to gases and liquids, for example, vulcanized rubber, styrenebutadiene copolymers, acrylnitrile-butadiene copolymers, butyl rubber, polychlorobutadiene, silicon rubber, polyolefins and the like. Particularly suited are fluorine-containing polyhydrocarbons such as, polytetrafluoroethylene, polychlorotrifluoroethylene. The center insulating body or member 9 is enclosed by two insulating bodies or members 8 and 10 consisting of a material having form- or shape stability, whereby these insulating bodies 8 and 10 must have a high mechanical rigidity. Suitable as form-stable or form-rigid materials are, for example, phenol-formaldehyde resins, some polyamides, melamine resins, polyesters, polyimides or polyoxy-methylene. Good results are achieved if the ratio of the elasticity modulus of the outer insulating members to that of the inner insulating member is larger than 5:1. Polysulfone has proved as particularly suitable for that purpose. The two outer insulating bodies 8 and 10 are axially tightened by means of the nut 6 and the collar 4 and thereby deform the insulating body 9 so that a tight seal is achieved between container wall 1 and bolt part 3. Generally, one will work with narrow tolerances, that is, in the non-tightened condition, the interstices between the wall 1, the insulating bodies and the bolt part 3 are only slight. It is achieved thereby that only a relatively small axial travel of the insulating bodies 8 and 10 suffices in order to achieve the necessary tightening or clamping action. The insulating bodies 8 and 10 are provided on the side facing the deformable material, as shown in FIG. 1, with an annular cutting edge 18. It has proved as particularly favorable if the sides of the annular cutting edge form with each other an angle of 90°. It is additionally of advantage if the insulating bodies 8 and 10 are provided, as shown, with a collar 20 which, during the tightening, rests on the wall 1. This collar 20 then forms an additional protection against a possible short-circuit between the wall 1 and the collar 4, respectively, the nut 6 and the washer 7. It additionally facilitates as abutment the automatic tightening or clamping during the assembly.

The axial tightening can, of course, also take place in any other conventional manner, for example, with a bolt having an apertured slot, by means of a wedge. A matching of the sealing capacity to the most varied requirements can be realized by the wall thickness of the insulating bodies as well as by the height of the center insulating body 9 and/or by the height of the raised portions 18. As a rule, a ratio of the diameter of the bolt part 3 to the height of the body 9 of about 1:0.5 to about 1:1.5 has proved as appropriate. Particularly appropriate is in general a ratio of 1:1. The wall thickness, respectively, the thickness of the insulating body amounts in general to about 20% to about 40% of the diameter of the bolt part 3. A wall thickness of approximately 30% as well suited for the present invention. Of course, the operating conditions for the lead-out must be taken into consideration in connection with the material selection for the insulating members, such as, temperature, pressure or chemical attack, for example, by electrolytes with particular regard to the electrical insulating properties.

Figure 2:
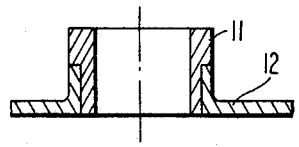
FIG. 2 is an axial cross-sectional view through a modified embodiment of an external sleeve connected with the container material for an electrical lead-out in accordance with the present invention.

If an electrical lead-out has to be installed into a thin-walled container, then, as shown in FIG. 2, a sleeve 11 is connected with the wall 12, for example, by welding, soldering or rolling-in.

Figure 3:
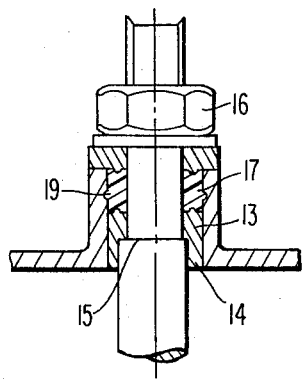
FIG. 3 is an axial cross-sectional view through still another modified embodiment of an electrical lead-out in accordance with the present invention.

Another form of electrical lead-out is shown in FIG. 3, which is recommended if the electrical lead-out is to be installed from the outside. The lower insulating body or member 13 includes a ring-shaped neck extension 14, into which is fitted the collar 15 of the current-conducting bolt which, in this case, is cylindrical. The center insulating body 17 is also correspondingly deformed in this case by tightening of the nut 16. It may happen thereby that alone the friction forces at the outer surface of the center insulating body 17 must maintain equilibrium with the forces which result from the pressure on the inside of the container. It is therefore appropriate at times to keep the height of the center insulating body 17 larger than usual. Additionally, for purposes of improving the adherence, one or several annular grooves 19 may be provided in the outer sleeve. The cross section of these annular grooves 19 is preferably triangular or circular. It is recommended for purposes of better insulation to inset the collar 15 of the terminal bolt into the adjoining insulating body 13.

The electrical lead-outs are provided in the usual manner with possibilities for the connection to power sources, for example, with threads, bolts, slots, webs, bores, soldering lugs and the like. These possibilities are not shown in the drawing. For example, in FIG. 1 a soldering tab may be placed over the bolt above the nut 6 and may be secured by means of a further nut.

In order to avoid a rotation of the arrangement during the tightening of such a nut, the bolt 2 may be constructed in the upper area, for example, with two key faces, with a hexagon or with a slot which serves for holding stationary the bolt with the aid of a tool.

Modifications apparent to a person skilled in the art, of course, are to be considered within the purview of the present invention; thus, for example, the cutting edge, respectively, the annular bead of one or both external insulating parts may be inset or embedded therein as separate workpiece. Similarly, the collar 4 can be replaced by a separate axial locking ring, for example, by a Circlip lock-ring engaging in an annular groove.

The construction according to the present invention offers with respect to the state of the art, the advantages of symmetry of the load distribution over the cutting edge, respectively, the annular bead and therewith uniform loading and stressing of the non-deformable outer parts so that the danger of breakage during tightening of this seal is slight. It is also important that as a result of the ring-shaped raised portion a uniform displacement of the material of the center part takes place, which must seal both with respect to the terminal bolt as also with respect to the outer sleeve. As shown in FIGS. 1 to 3, in contrast to the construction published by Warnock, the present invention permits, depending on the construction, an abutment limit of the tightening or assembly from the outside. As a result thereof, the assembly in mass production becomes flexible and simple.

The attainable tightness of the electrical lead-out is excellent; thus, for example, with a hydrogen pressure of about 65 bars leakage rates were noted which corresponded merely to the diffusion rate of hydrogen through the materials.

While I have shown and described several embodiments in accordance with the present invention, it is understood that the same is not limited thereto but is susceptible of numerous changes and modifications as known to those skilled in the art, and I therefore do not wish to be limited to the details shown and described herein, but intend to cover all such changes and modifications as are encompassed by the scope of the appended claims.

I claim:

1. A disassemblable gas-tight and pressure-resistant electrical lead-out for battery cells, comprising a substantially rigid metallic external sleeve means, a metallic bolt means effecting current conduction and insulating means disposed between the sleeve means and the bolt means and including three sleeve-shaped insulating members disposed axially one behind the other and substantially filling out the space between the bolt and sleeve means, the center insulating member being made of a practically gas-tight deformable material while the two outer insulating members are made from a substantially form-stable material, and at least one of the two outer insulating members being adapted to be axially tightened with respect to the center insulating member, characterized in that the two outer insulating members are provided on their sides facing the center member with a ring-shaped raised portion which during axial tightening penetrates in the center insulating member.

2. An electrical lead-out according to claim 1, characterized in that the ring-shaped raised portion is provided substantially centrally on the side of the outer member facing the center member.

3. An electrical lead-out according to claim 1 or 2, characterized in that the raised portion is constructed as cutting edge.

4. An electrical lead-out according to claim 3, characterized in that the flanks of the raised portion subtend an angle of approximately 60° to 120°.

5. An electrical lead-out according to claim 4, characterized in that the flanks of the raised portion form an angle of about 90° and are substantially the same length and substantially straight.

6. An electrical lead-out according to claim 3, characterized in that the raised portion is constructed as annular bead.

7. An electrical lead-out according to claim 1, characterized in that the height of the center insulating member is at least approximately equal to the diameter of the bolt means within the area of the center member.

8. An electrical lead-out according to claim 1 or 7, characterized in that the outer diameter of at least one of the two outer insulating members is larger than the diameter of the center member.

9. An electrical lead-out according to claim 8, characterized in that the ratio of the modulus of elasticity of the external insulating members to the inner insulating member is larger than about 5:1.

10. An electrical lead-out according to claim 9, characterized in that the two outer insulating members consist of polysulfone and the center insulating member of polytetrafluoroethylene.

11. An electrical lead-out according to claim 1 or 2, characterized in that the bolt means includes a bolt collar, in that the diameter of the bolt collar is smaller than the diameter of the adjoining insulating member, and in that the outer sleeve means is provided on its inner sealing wall with at least one annular groove.

12. An electrical lead-out according to claim 11, characterized in that the annular groove is of triangular cross section.

13. An electrical lead-out according to claim 11, characterized in that the annular groove is of approximately partly circular cross section.

14. An electrical lead-out according to claim 11, characterized in that the collar is inset into the adjoining insulating member.

15. An electrical lead-out according to claim 1 or 2, characterized in that the raised portion is constructed as annular bead.

16. An electrical lead-out according to claim 1 or 2, characterized in that the ratio of the modulus of elasticity of the external insulating members to the inner insulating member is larger than about 5:1.

17. An electrical lead-out according to claim 1 or 2, characterized in that the two outer insulating members consist of polysulfone and the center insulating member of polytetrafluoroethylene.

18. An electrical lead-out according to claim 16, characterized in that the raised portion is constructed as cutting edge.

19. An electrical lead-out according to claim 16, characterized in that the raised portion is constructed as annular bead.

* * * * *